(12) United States Patent  (10) Patent No.: US 8,724,594 B2
Chen  (45) Date of Patent: May 13, 2014

(54) METHOD FOR MEASURING ADJACENT AREAS

(75) Inventor: Liping Chen, Guangdong Province (CN)

(73) Assignee: ZTE Corporation, Shenzhen (CN)

( * ) Notice: Subject to any disclaimer, the term of this patent is extended or adjusted under 35 U.S.C. 154(b) by 450 days.

(21) Appl. No.: 13/054,762

(22) PCT Filed: Jul. 17, 2009

(86) PCT No.: PCT/CN2009/072821
§ 371 (c)(1), (2), (4) Date: Jan. 18, 2011

(87) PCT Pub. No.: WO2010/006559
PCT Pub. Date: Jan. 21, 2010

(65) Prior Publication Data
US 2011/0122823 A1  May 26, 2011

(30) Foreign Application Priority Data

Jul. 17, 2008 (CN) .......................... 2008 1 0132478
Jul. 24, 2008 (CN) .......................... 2008 1 0132295

(51) Int. Cl.
*H04W 4/00* (2009.01)
*H04B 7/216* (2006.01)
*H04J 3/06* (2006.01)
*H04B 17/00* (2006.01)
*H04B 7/00* (2006.01)

(52) U.S. Cl.
USPC ........... 370/332; 370/342; 370/345; 370/350; 455/67.16; 455/232.1; 455/434

(58) Field of Classification Search
USPC ................. 370/328, 331–332, 350, 342, 345; 455/232.1–253.2, 434–444, 67.11, 455/67.16
See application file for complete search history.

(56) References Cited

U.S. PATENT DOCUMENTS

| 2004/0053615 | A1* | 3/2004 | Kim et al. ...................... 455/436 |
| 2006/0034228 | A1 | 2/2006 | Kim et al. |
| 2006/0121935 | A1* | 6/2006 | Dalsgaard et al. ......... 455/552.1 |
| 2007/0140203 | A1* | 6/2007 | Qiao .............................. 370/342 |
| 2007/0173254 | A1 | 7/2007 | Tebbit et al. |
| 2007/0189229 | A1* | 8/2007 | Li et al. ......................... 370/335 |
| 2009/0207811 | A1* | 8/2009 | Zhu et al. ...................... 370/332 |

FOREIGN PATENT DOCUMENTS

WO  WO-2007143893 A1  12/2007
WO  WO-2007147305 A1  12/2007

* cited by examiner

*Primary Examiner* — Un C Cho
*Assistant Examiner* — Jeremy Costin
(74) *Attorney, Agent, or Firm* — Venable LLP; Robert S. Babayi

(57) ABSTRACT

The present invention discloses a method for measuring adjacent cells, and the method is used for measuring adjacent cells by using dormant idle sub-frames to receive specified data from a network side in an idle state, and adjacent cells are measured by using an idle window to receive the specified data from the network side in a connection state. The present invention realizes measurement of the TD-SCDMA adjacent cells in a WCDMA mode and measurement of the WCDMA adjacent cells in a TD-SCDMA mode; and further more achieves reselection and switching from WCDMA to TD-SCDMA adjacent cell and from the TD-SCDMA to WCDMA adjacent cell on this basis, meets a real-time requirement effectively, and has high practical value.

7 Claims, 6 Drawing Sheets

METHOD FOR MEASURING ADJACENT AREAS

CROSS-REFERENCE TO RELATED APPLICATIONS

This application is a National Stage Application of PCT/CN2009/072821, filed Jul. 17, 2009, which designates the United States and claims priority to Chinese Patent Application No. 200810132478.4, filed on Jul. 17, 2008, and Chinese Patent Application No. 200810132295.2, filed on Jul. 24, 2008.

FIELD OF THE INVENTION

The present invention relates to an adjacent cells measuring technology, and particularly to a method for measuring adjacent cells.

BACKGROUND OF THE INVENTION

A patent (WO2007147305) entitled "A METHOD FOR STARTING TD-SCDMA AND GSM DUAL MODE MOBILE TERMINAL" discloses a method for switching on a TD-SCDMA and WCDMA dual mode mobile terminal. This method is suitable for various standby modes, using a solution of switching on the terminal sequentially in two modes of TD-SCDMA and WCDMA in dual standby states and capable of avoiding mutual interference of the two modes upon switching on the terminal.

A patent (WO2007143893) entitled "CALLING METHOD OF TD-SCDMA AND GSM DUAL-MODE MOBILE TERMINAL" discloses a method for switching off a TD-SCDMA and WCDMA dual mode mobile terminal. This method is suitable for various standby modes, using a solution of switching off the terminal sequentially in two modes of TD-SCDMA and WCDMA in dual standby states and capable of avoiding mutual interference of the two modes upon switching off the terminal.

However, currently there are not definite regulations or standards that specify a method for measuring TD-SCDMA adjacent cells in the WCDMA mode and a method for measuring WCDMA adjacent cells in the TD-SCDMA mode.

SUMMARY OF THE INVENTION

The present invention aims to provide a method for measuring adjacent cells to realize measuring TD-SCDMA adjacent cells in the WCDMA mode and measuring WCDMA adjacent cells in the TD-SCDMA mode.

The present invention provides a method for measuring adjacent cells, which is adapted to measure TD-SCDMA adjacent cells in a WCDMA mode when TD-SCDMA timing has not been obtained, wherein a terminal in an idle state uses dormant idle WCDMA sub-frames to receive data of TD-SCDMA adjacent cells specified by a network side so as to measure the TD-SCDMA adjacent cells, and in a connection state uses an idle window of the WCDMA subframes to receive data of TD-SCDMA adjacent cells specified by the network side so as to measure the TD-SCDMA adjacent cells, and particularly the method comprises the following steps:

step A, receiving the data of the TD-SCDMA adjacent cells, performing automatic gain control adjustment and coarse synchronization adjustment of frequency points of the TD-SCDMA adjacent areas, thereby obtaining a stable automatic gain control value of one frequency point, and the success of the coarse synchronization of the frequency point;

step B, receiving data relevant to a downlink synchronization code according to a coarse synchronization position, finding out a position where a relevant peak is the highest which is to be used as a TD-SCDMA timing, and determining an observation time difference of all the TD-SCDMA adjacent cells with respect to the TD-SCDMA timing under the frequency point; and step C, receiving data in the 0th time slot relevant to a training sequence code under the frequency point according to the TD-SCDMA timing, which is for calculating a received signal code power of the TD-SCDMA adjacent cells whose observation time difference has been obtained, wherein the present step is performed three times and an average value of the measurements of the received signal code powers of the three times is reported to the network side.

Further, the idle window is formed in a compress mode; the pattern of the compress mode is specified by the network side, particularly comprising: the number, the position and the length of the idle window, and the number of TD-SCDMA frames using the idle window.

Further, in step A, if the coarse synchronization of all the frequency points of the TD-SCDMA adjacent cells can not succeed, the terminal reports to the network side the minimum value as the received signal code powers of all the TD-SCDMA adjacent cells.

Preferably, in step A, performing coarse synchronization to one frequency point of the TD-SCDMA adjacent cells requires receiving data of the TD-SCDMA adjacent cells once.

Preferably, the amount of the data of the TD-SCDMA adjacent cells is received with a length of 1 frame plus 128 chips at every time.

The present invention also provides a method for measuring adjacent cells, which is adapted to measure TD-SCDMA adjacent cells in a WCDMA mode when TD-SCDMA timing has been obtained, wherein a terminal in an idle state uses dormant idle WCDMA sub-frames to receive data of TD-SCDMA adjacent cells specified by a network side so as to measure the TD-SCDMA adjacent cells, and in a connection state uses an idle window of the WCDMA sub-frames to receive data of TD-SCDMA adjacent cells specified by the network side so as to measure the TD-SCDMA adjacent cells, and particularly the method comprises the following steps:

step a, receiving the data of the TD-SCDMA adjacent cells, performing automatic gain control adjustment of one frequency point of the TD-SCDMA adjacent cells, thereby obtaining a stable automatic gain control value of the frequency point;

step b, receiving data relevant to a downlink synchronization code, and determining an observation time difference of all the TD-SCDMA adjacent cells with respect to the TD-SCDMA timing under the frequency point; and step c, receiving data in the 0th time slot relevant to a training sequence code under the frequency point according to the TD-SCDMA timing, which is for calculating a received signal code power of the TD-SCDMA adjacent cells whose observation time difference has been obtained, wherein steps b-c are performed three times and an average value of the measurements of received signal code powers of the three times is reported to the network side.

Further, the idle window is formed in a WCDMA compress mode; the pattern of the compress mode is specified by the network side, particularly comprising: the number, the position and the length of the idle window, and the number of TD-SCDMA frames using the idle window.

The present invention also provides a method for measuring adjacent cells, which is adapted to measure WCDMA adjacent cells in a TD-SCDMA mode, wherein a terminal in an idle state uses dormant idle TD-SCDMA sub-frames to receive data of WCDMA adjacent cells specified by a network side so as to measure the WCDMA adjacent cells, and in a connection state or a high speed downlink packet access state uses an idle window of the TD-SCDMA sub-frames to receive data of WCDMA adjacent cells specified by the network side so as to measure the WCDMA adjacent cells, and particularly the method comprises the following steps:

step A, receiving data of the WCDMA adjacent cells, performing synchronization processing of time slot, and determining a time slot synchronization point;

step B, determining a secondary synchronization sequence group of a cell according to a scramble code number of the WCDMA adjacent cells;

step C, determining a start-position of a WCDMA frame; and step D, taking ten consecutive symbols obtained by de-spreading a common pilot channel and then calculating a received signal code power.

Further, there are two idle time slots in the idle windows of the TD-SCDMA subframes in the connection state; and there are the 0th time slot and a downlink pilot time slot in the TD-SCDMA subframes in the high speed downlink packet access state.

Further, prior to step A, the method further comprises the following steps: receiving measuring adjacent cells information sent from the network side, wherein the scramble code numbers and the frequency points of the WCDMA adjacent cells to be measured this time are specified.

Preferably, the procedure of the time slot synchronization for determining the time slot synchronization point particularly comprises: receiving the data of the WCDMA adjacent cells with a length of 1 time slot plus 256 chips, and correlating the data with a local primary synchronization code to obtain a correlation result of 1 time slot, and determining the time slot synchronization point according to the peak of the correlation result.

Preferably, the procedure of determining the start-position of the WCDMA frame is as follows: in the idle state, the data of 15 continuous time slots of the WCDMA adjacent cells is received according to the determined time slot synchronization point, and the first 256 chips are taken out from each time slot to constitute a sequence A; the sequence A is correlated sequentially with 15 secondary synchronization sequences of the WCDMA adjacent cells, a sliding step length is 256 chips, and the start-position of the WCDMA frame is determined according to the peak of 15 correlation results; or in the connection state or the high speed downlink packet access state, the data of one time slot of the WCDMA adjacent cells is received according to the time slot synchronization point, and the data is correlated with each sequences in the secondary synchronization sequence group of the cell, and if time slot number corresponding to the peak of the correlation results is one, the start-position of the WCDMA frame is determined by the time slot number; if time slot number determined is two, then the data of one time slot of the WCDMA adjacent cells is received again, and the two determined time slot numbers respectively plus the number of the time slots of the gap between the two receptions to obtain two possibilities of the time slot number of the data received this time, and the data received this time is correlated with the secondary synchronization sequences corresponding to the two possible time slot numbers, and the time slot number of the data received this time is determined according to the peak of the correlation results and the position where the WCDMA frame head appears is determined according to the time slot number.

Further, after step D, the method further comprises: repeating step D, and then reporting to a higher layer the average value of the measurements of the received signal code powers of two times.

Further, in step D, the de-spreading is performed according to the channelization code and the primary scrambling code specifically used by the common pilot channel (i.e. CPICH).

The present invention receive data specified by a network side using dormant idle frames to measures adjacent cells in an idle state and receive data specified by the network side using an idle window (compress gap) to measures adjacent cells in a connection state, and thus realizes adjacent cells measurement of the TD-SCDMA in a WCDMA mode and adjacent cells measurement of the WCDMA in a TD-SCDMA mode; and also achieves reselection and switching of the WCDMA to TD-SCDMA adjacent cells and the TD-SCDMA to WCDMA adjacent cells on this basis, meets a real-time requirement effectively, and has high practical value.

DETAILED DESCRIPTION OF THE EMBODIMENTS

The core concept of the present invention is to use dormant idle frames to receive data specified by a network side to measure adjacent cells in an idle state and to use an idle window to receive data specified by a network side to measure adjacent cells in a connection state.

The specific process of realizing the present invention will be further described in detail hereinafter in conjunction with the accompanying drawings. For the convenience of description, the measurement of TD-SCDMA adjacent cells in the WCDMA mode and the measurement of WCDMA adjacent cells in the TD-SCDMA mode will be respectively described.

When TD-SCDMA adjacent cells are measured in the WCDMA mode, a terminal in an idle state uses dormant WCDMA sub-frames to receive the data of the TD-SCDMA adjacent cells specified by the network side to measure the TD-SCDMA adjacent cells, and in a connection state uses an idle window of the WCDMA subframes to receive the data of the TD-SCDMA adjacent cells specified by the network side to measure the TD-SCDMA adjacent cells, thereby ensuring the realization of measuring the TD-SCDMA adjacent cells in the WCDMA mode.

There are two situations of measuring the TD-SCDMA adjacent cells in the WCDMA mode: the first one is applicable to a situation in which TD-SCDMA timing has not been obtained, which is referred to as the first WCDMA mode; and the second one is applicable to a situation in which the TD-SCDMA timing has been obtained, which is referred to as the second WCDMA mode, and they will be described hereinafter respectively.

Here it needs to be explained that the measurement between a WCDMA system and TD supports measurement of 32 cells at most, and the 32 cells comprise at most 3 Time Division Duplex (TDD) frequency points.

Figure 1:
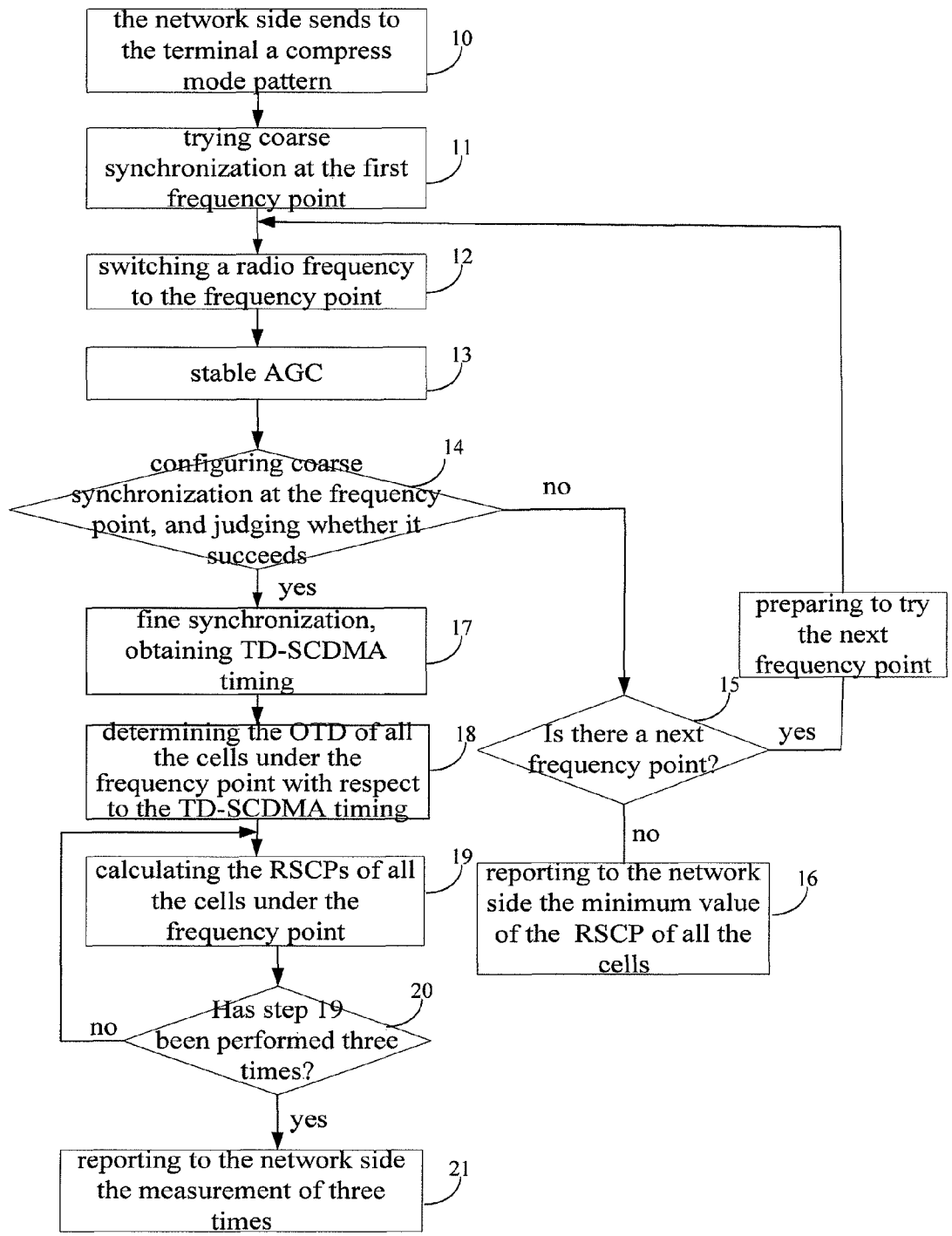
FIG. 1 is a flow chart of the first method for measuring the TD-SCDMA adjacent cells in a WCDMA mode of the present invention.

Referring to FIG. 1, it is a flow chart of the first method for measuring the TD-SCDMA adjacent cells in a WCDMA mode of the present invention. In this method, the terminal in the idle state uses dormant idle frames to receive data to measure the TD-SCDMA adjacent cells, and in a connection state uses an idle window (compress gap) formed in a compress mode to receive data to measure the TD-SCDMA adjacent cells. The specific realization process is as follows:

Step 10, the network side sends to the terminal a compress mode pattern used for TDD mode measurement in the connection state.

The content of the pattern comprises the number, the position and the length of the idle window formed in a compress mode in 1 TD-SCDMA frame, and the number of TD-SCDMA frames using the idle window formed in the compress mode. The pattern is accurately represented by parameters of TGSN (Transmission Gap Starting Slot Number), TGL1 (Transmission Gap Length 1), TGL2 (Transmission Gap Length 2), TGD (Transmission Gap start Distance), TGPL1 (Transmission Gap Pattern Length), TGPRC (Transmission Gap Pattern Repetition Count) and TGCFN (Transmission Gap Connection Frame Number).

Step 11, the terminal tries coarse synchronization at the first frequency point.

Step 12, the terminal switches a radio frequency to the frequency point that prepares to try the coarse synchronization.

Step 13, the terminal receives TD-SCDMA data several times (currently it is set to be 4), and in the idle state uses dormant idle frames to receive the data and in the connection state uses the idle window formed in the compress mode to receive the data, for automatic gain control (AGC) adjustment, until a stable AGC value of the frequency point is obtained.

Step 14, the terminal receives the TD-SCDMA data once, and in the idle state uses dormant idle frames to receive the data and in the connection state uses the idle window formed in the compress mode to receive the data, and configures through sliding relevant algorithm the coarse synchronization in the idle window which can completely receive the data of 1 TD-CDMA frame plus 128 chips, and if successful, it turns to step 17, and otherwise it turns to step 15.

Step 15, the terminal judges whether there is any frequency point that has not tried the coarse synchronization, and if there is, it is prepared to try this frequency point and returns to step 12, and otherwise it turns to step 16.

Step 16, the terminal reports to the network side the minimum value as the received signal code powers (RSCP) of all the TD-SCDMA adjacent cells.

Step 17, the terminal receives data of a 128 chip length relevant to a downlink synchronization code (sync_dl) according to a coarse synchronization position, and the terminal in the idle state uses the dormant idle frames to receive the data and in a connection state uses the idle window formed in the compress mode to receive the data, and finds out a position where the highest relevant peak is located after the downlink synchronization codes fall into the idle window completely and obtains a frame head as the TD-SCDMA timing according to the position. Since the TD-SCDMA system is a synchronous system, if the timing of one cell (that is, the position of the frame head of the cell) is found, it is deemed that the timing of the overall TD-SCDMA system is obtained.

Step 18, the terminal determines an observation time difference (OTD) of all the TD-SCDMA adjacent areas with respect to the TD-SCDMA timing under the frequency points whose coarse synchronization is successful.

Step 19, according to the TD-SCDMA timing the terminal receives data relevant to a training sequence (midamble) code in the 0th time slot (i.e. TS0) under the frequency points whose coarse synchronization is successful, and in the idle state uses dormant idle frames to receive the data and in the connection state uses the idle window formed in the compress mode to receive the data, and in the case that the received data all falls within the idle window, the RSCP of the TD-SCDMA adjacent cells whose OTD has been obtained is determined according to the received midamble relevant data.

Step 20, it is judged whether step 19 has been performed three times, and if so, the next step will be executed, and if not, it returns to step 19.

Step 21, the terminal reports to the network side the average value of the measurements of RSCP of three times.

In step 19, due to the restriction of the processing ability of an RSCP module, the terminal can determine the RSCPs of four adjacent cells via the data relevant to the midambl code received by the RSCP module every time, and thus if the number of the TD-SCDMA adjacent cells under a certain frequency point is larger than four, the RSCP module needs to perform the reception and calculation multiple times until obtaining the RSCP measurements of all the TD-SCDMA adjacent cells under the frequency point.

The above method describes the flow that the terminal measures the TD-SCDMA adjacent cells in the WCDMA mode in the situation in which the TD-SCDMA timing has not been obtained, while the method can only measure all the TD-SCDMA adjacent cells under one frequency point whose coarse synchronization is successful, and the TD-SCDMA adjacent cells under the other frequency points are measured using the following method.

Figure 2:
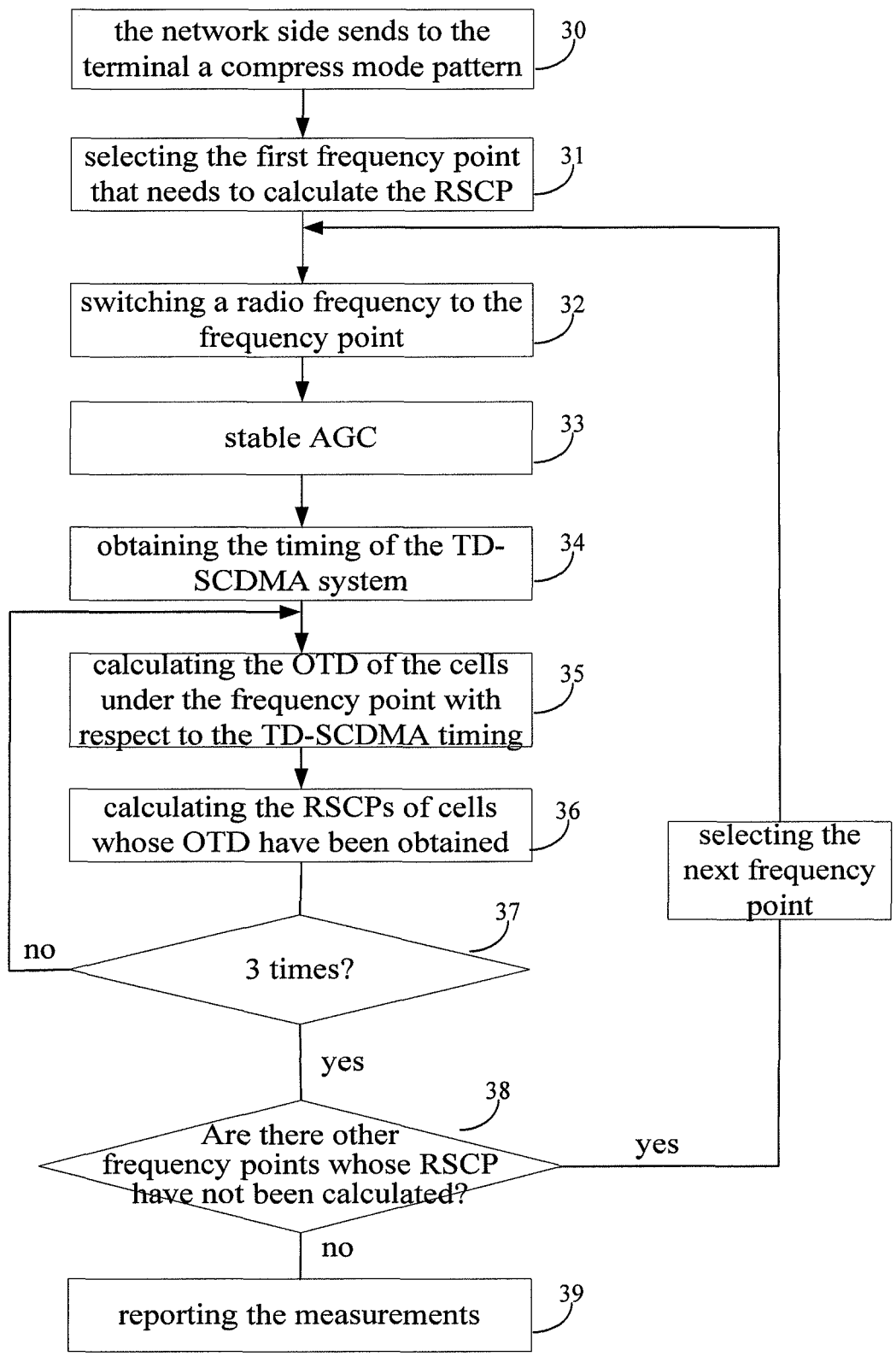
FIG. 2 is a flow chart of the second method for measuring the TD-SCDMA adjacent cells in a WCDMA mode proposed by the present invention.

Referring to FIG. 2, it is a flow chart of the second method for measuring the TD-SCDMA adjacent cells in the WCDMA mode of the present invention. In this method, the terminal in the idle state uses dormant idle frames to receive data to measure the TD-SCDMA adjacent cells, and in the connection state uses an idle window formed in the compress mode to receive data to measure the TD-SCDMA adjacent cells. The specific realization process is as follows:

Step 30, the network side sends to the terminal a compress mode pattern used for the measurement of TDD mode in the connection state.

The content of the pattern comprises the number, the position and the length of the idle window formed in the compress mode in one TD-SCDMA frame, and the number of TD-SCDMA frames using the idle window formed in the compress mode. The pattern is accurately represented by parameters of TGSN (Transmission Gap Starting Slot Number), TGL1 (Transmission Gap Length 1), TGL2 (Transmission Gap Length 2), TGD (Transmission Gap start Distance), TGPL1 (Transmission Gap Pattern Length), TGPRC (Transmission Gap Pattern Repetition Count) and TGCFN (Transmission Gap Connection Frame Number).

Step 31, the terminal selects the first frequency point that needs to calculate the RSCP.

Step 32, the terminal switches a radio frequency to the frequency point selected this time.

Step 33, the terminal receives TD-SCDMA data several times (currently it is set to be 4), and in the idle state uses dormant idle frames to receive the data and in the connection state uses the idle window formed in the compress mode to receive the data for AGC adjustment, and obtains a stable AGC value of the frequency point selected this time.

Step 34, the timing of a TD-SCDMA system is obtained.

In this step, the terminal uses a downlink synchronization tracking (DST) module to generate the timings of several (currently it is 4) TD-SCDMA cells, and since the TD-SCDMA system is a synchronous system, if the timing of one cell is obtained, it is deemed that the timing of the overall TD-SCDMA system is obtained.

Step 35, the terminal receives data of 128 chip length relevant to a sync_dl code, and the terminal in the idle state uses the dormant idle frames to receive the data and in a connection state uses the idle window formed in the compress mode to receive the data, and the received sync_dl code is used to determine the OTD of all the TD-SCDMA adjacent cells with respect to the TD-SCDMA timing under the frequency point selected this time.

Step 36, according to the obtained TD-SCDMA timing the terminal receives data relevant to a midambl code in the 0th time slot (i.e. TS0) under the frequency point selected this time, and in the idle state uses dormant idle frames to receive the data and in the connection state uses the idle window formed in the compress mode to receive the data, and thus the RSCP of the TD-SCDMA adjacent cells whose OTD has been obtained is determined.

Step 37, it is judged whether steps 35 to 36 have been performed three times, and if so, the next step will be executed, and if not, it returns to step 35.

Step 38, the terminal judges whether there are other frequency points whose RSCPs have not been calculated, and if there are, the frequency points are selected, and then it returns to step 32, otherwise the next step will be executed.

Step 39, the terminal reports to the network side all the RSCP measurements of all the frequency points.

Figure 3:
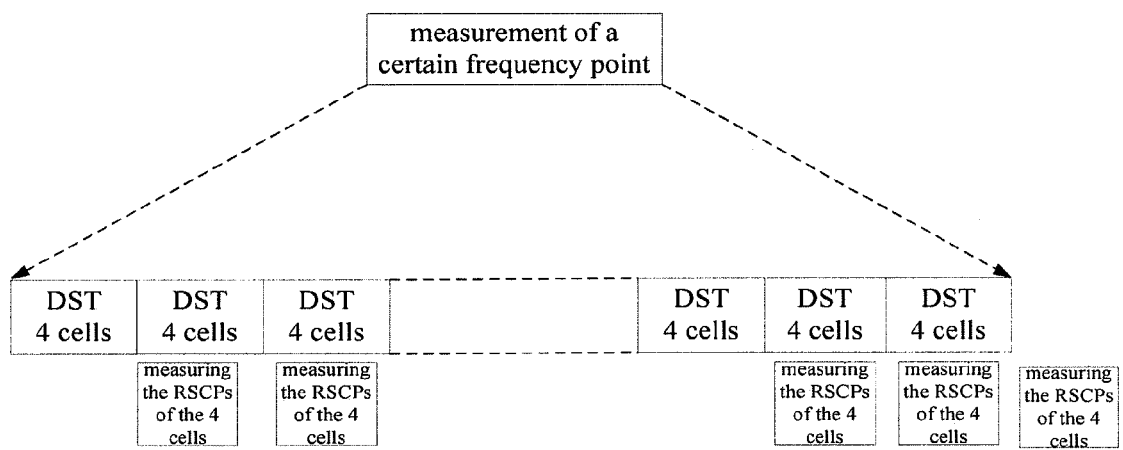
FIG. 3 is a schematic view of the measuring process of the frequency points in the second method of the present invention.

In the above flow, step 35 is completed by the DST module, and step 36 is completed by the RSCP module. Due to the restriction of the processing ability, the terminal can only determine the OTDs of four TD-SCDMA cells with respect to the TD-SCDMA timing under the present frequency point through the data relevant to the sync_dl code received by the DST module every time; and the terminal can only determine the RSCPs of four TD-SCDMA adjacent areas whose OTDs have been obtained through the data relevant to the midambl code received by the RSCP module every time. To improve the efficiency, the terminal can receive the data relevant to the midambl code in the 0th time slot (i.e. TS0) and the data relevant to the sync_dl at one time, and thus the DST module and the RSCP module can process in parallel, and as shown in FIG. 3, that is, when the DST module is calculating the OTDs of a new group of four cells, the RSCP module is calculating the RSCPs of the last group of 4 cells whose OTDs have been obtained at the same time.

When WCDMA adjacent cells are measured in the TD-SCDMA mode, the terminal in the idle state uses dormant TD-SCDMA sub-frames to receive data of the WCDMA adjacent cells specified by the network side so as to measure the WCDMA adjacent cells, and in the connection state or the high speed downlink packet access state uses the idle window of the TD-SCDMA subframes to receive data of the WCDMA adjacent cells specified by the network side so as to measure the WCDMA adjacent cells, thereby ensuring the realization of measuring the WCDMA adjacent cells in the TD-SCDMA mode.

A user equipment (UE) in the TD-SCDMA system measures 32 frequency division duplex (FDD) cells at most, which is with at most 3 FDD frequency points.

The measurement period of the UE in the connection state/high speed downlink packet access (HSDPA) state in the TD-SCDMA system is 480 ms, and the measurement period of the UE in the idle state in the TD-SCDMA system is represented by the following table:

| DRX (Discontinuous Reception) cycle length Unit s | Measurement period (DRX cycle number) Unit s |
| --- | --- |
| 0.08 | 0.64 (4) |
| 0.16 | 1.28 (4) |
| 0.32 | 1.28 (2) |
| 0.64 | 1.28 (1) |
| 1.28 | 1.28 (1) |
| 2.56 | 2.56 (1) |
| 5.12 | 5.12 (1) |

Figure 4:
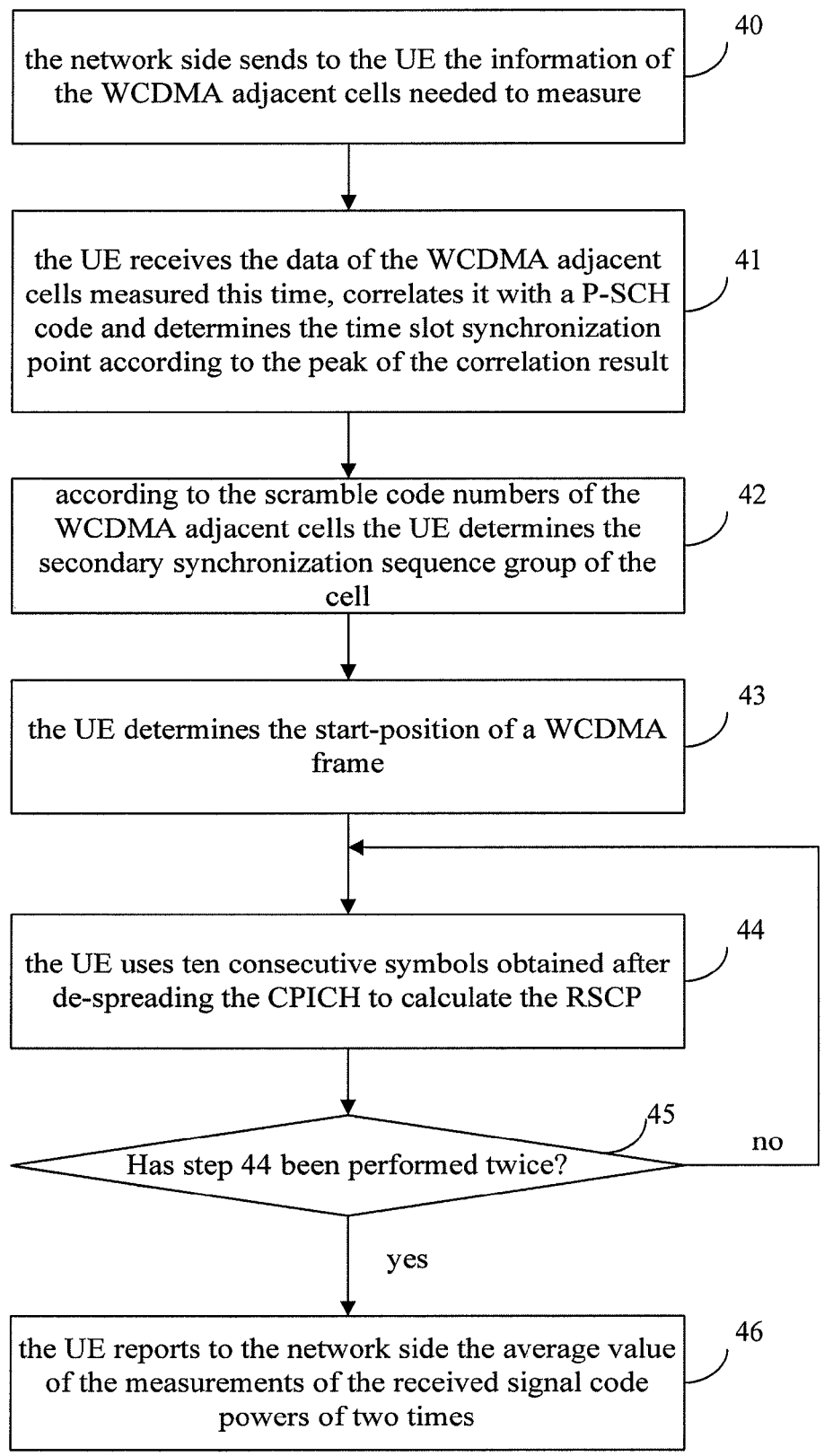
FIG. 4 is a flow chart of the method for measuring the WCDMA adjacent cells in the TD-SCDMA mode proposed by the present invention.

Referring to FIG. 4, it is an outline flow chart of the method for measuring the WCDMA adjacent cells in the TD-SCDMA mode of the present invention, and the main implementation process is as follows:

Step 40, the network side sends to the UE information of the WCDMA adjacent cells needed to measure, wherein the scramble code numbers and the frequency points of the WCDMA adjacent cells measured this time are specified.

Step 41, the UE receives the data of the WCDMA adjacent cells measured this time with length of 1 time slot plus 256 chips and correlates it with a local primary synchronization (P-SCH) code (256 chip, the overall TD-SCDMA network uses the same P-SCH code) to obtain a correlation result of 1 time slot, and determines the time slot synchronization point according to the peak of the correlation result.

Step 42, according to the scramble code numbers of the WCDMA adjacent cells measured this time, the UE can know the group number among the 64 scrambling code groups that the cell belongs to, that is, the scrambling code group number can be obtained, and 15 secondary synchronization sequences used in one frame is determined according to the scrambling code group number.

Step 43, the UE determines the start-position of a WCDMA frame.

In the idle state, the UE can directly uses a frame synchronization algorithm for adjacent cells measurement in the WCDMA mode to determine the start-position of a WCDMA frame, and one frame of WCDMA data needs to be received, and in the connection state/HSDPA state, since there is not enough radio frequency idle time, the frame synchronization algorithm for the adjacent cells measurement can not be directly used, and a new algorithm needs to be designed according to the idleness of the time slots in the TD-SCDMA subframes to complete frame synchronization.

Step 44, according to the channelization code $C_{256}^{0}$ and a primary scrambling code specifically used by a CPICH (Common Pilot Channel), the UE de-spreads the CPICH and uses ten consecutive symbols obtained after the de-spreading, to calculate the RSCP received signal code power.

Step 45, the UE judges whether step 44 has been executed twice, and if yes, the next step will be executed, and otherwise it returns to step 44.

Step 46, the UE reports to a higher layer the average value of the measurements of the received signal code powers of two times.

In the above flow, when the UE is in the idle state, the present invention completes measuring the RSCP of the WCDMA adjacent cells in a manner of configuring the measurement of the WCDMA adjacent cells at the dormant TD-SCDMA sub-frames within a paging interval, and this takes time of a few frames, and can totally meet the requirement of the measurement period in the idle state above.

While in the connection state/HSDPA state, the present invention completes measuring the RSCP of the WCDMA adjacent areas in a manner of configuring the measurement of the WCDMA adjacent areas in the idle time slots in the TD-SCDMA subframes.

Hereinafter, the existence of the idle time slots in the TD-SCDMA subframes in the connection state/HSDPA state will be analyzed first. Supposing the TD-SCDMA subframes support 2 transmit time slots, ts0 is used to receive a broadcast channel (BCH) and RSCP measurements, and for different TD-SCDMA services, the existence of the idle time slots in the TD-SCDMA subframes are respectively as follows:

1) for voice services of 12.2 k and 64 k, generally there is 1 receiving time slot and 1 transmit time slot, and thus there are 4 idle time slots;

2) for a downlink service of 144 k, generally there are 2 receiving time slots and 1 transmit time slot, and thus there are 3 idle time slots;

3) for a downlink service of 384 k, generally there are 3 receiving time slots and 1 transmit time slot, and thus there are 2 idle time slots; and 4) for an HSDPA service, there is no idle time slot at a peak rate.

Configuring the WCDMA adjacent areas measurement in the connection state/HSDPA state, firstly it needs to consider the normal receiving and transmitting of TD-SCDMA services; and then to consider the measurement configuration within the TD-SCDMA system, and relevant measurement of the RSCP of the TD-SCDMA adjacent areas needs to be configured at the TS0, and relevant measurement of interference signal code power (ISCP) of the TD-SCDMA services is performed at a service time slot.

Owing to the above description, for the configuration position of the WCDMA measurement, firstly, it needs to consider configuring the WCDMA adjacent areas measurement at the above idle time slots, and secondly, to consider using the TS0 time slot as possible as to configure the WCDMA adjacent areas measurement, which is of great importance to the WCDMA adjacent areas measurement in the HSDPA state.

Figure 5:
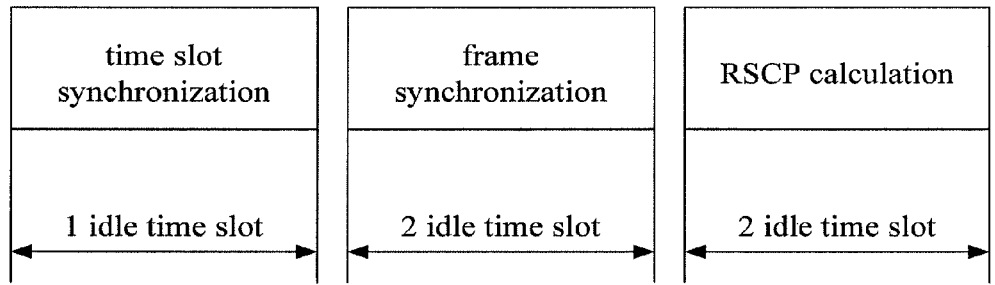
FIG. 5 is a schematic view of the data needed to receive in the steps of the present invention using TD-SCDMA idle time slots in a TD-SCDMA connection state/HSDPA state.

Referring to FIG. 5, it is a schematic view of receiving the data needed in the steps of the present invention using TD-SCDMA idle time slots in the TD-SCDMA connection state/HSDPA state, and the steps will be described hereinafter respectively.

In the step of time slots synchronization, the data with a length of 1 time slot plus 256 chip that needs to be received is about 0.66+0.013=0.673 ms which then plus the time of switching frequency points and it does not exceed the length of 1 TD-SCDMA time slot (864/1.28M=0.675 ms), and it is thus seen that using 1 TD-SCDMA time slot can complete time slot synchronization for one time.

In the step of frame synchronization, 2560 chip of WCDMA data needs to be received, and in the connection state the idle window consisting of 2 time slots can receive the data for one time, and 1 frame completes the frame-synchronization for one time; in the HSDPA state, using TS0+Dwpts (downlink pilot time slot) can receive the data for one time, and 1 frame completes the frame-synchronization for one time.

In step of calculating the RSCP, data relevant to 10 symbols needs to be received, whose length is the data of 1 WCDMA time slot length, being about 10/15 ms=0.66 ms which plus the switching time of the frequency points, and it does not exceed the length of 1 TD-SCDMA time slot (0.675 ms), and since the RSCP calculation needs sampling twice, then this step needs two TD-SCDMA time slots.

Owing to the above description, except the HSDPA state, in the connection state, each TD-SCDMA subframe at least has 2 idle time slots, and then 3 frames can complete measuring all the WCDMA adjacent cells under one frequency point, and one measurement period (480 ms) is about 96 frames which is enough for completing the measurement of the WCDMA adjacent cells; while in the HSDPA state, considering that the measurement is made at TS0+DwPTS, 3 frames can complete measuring all the WCDMA adjacent cells under one frequency point. In one measurement period (480 ms), the TS0 is firstly used to receive the BCHs of a serving cell and the adjacent areas and also performs intra-frequency measurement; secondly, the TS0 is also used to configure inter-frequency measurement within the TD-SCDMA system; finally at the TS0 the WCDMA adjacent cells measurement is configured. Upon rough estimation, there are tens of frames in the HSDPA mode for the WCDMA measurement, which are enough to complete the measurement of WCDMA adjacent cells.

Hereinafter the frame-synchronization algorithm used in the idle state and the connection state/HSDPA state will be described respectively.

In the idle state, the specific process of determining the start-position of the WCDMA frame is as follows:

1) according to the time slot synchronization point, the data of 15 continuous time slots of the WCDMA adjacent cell measured this time is received, and the first 256 chips are taken out from each time slot to constitute a sequence A;

2) the sequence A is sequentially correlated with 15 secondary synchronization sequences of the WCDMA adjacent cells measured this time, and each sliding step is 256 chips, and 15 correlation results are obtained; and 3) according to the peak of 15 correlation results, the start-position of the WCDMA frame is determined.

Figure 6:
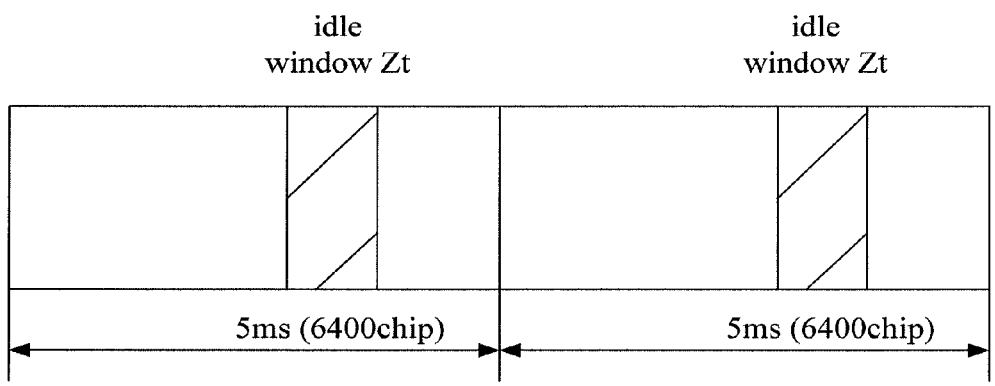
FIG. 6 is a schematic view of the idle window in the TD-SCDMA subframes in the TD-SCDMA connection state/HSDPA state.
Figure 7:
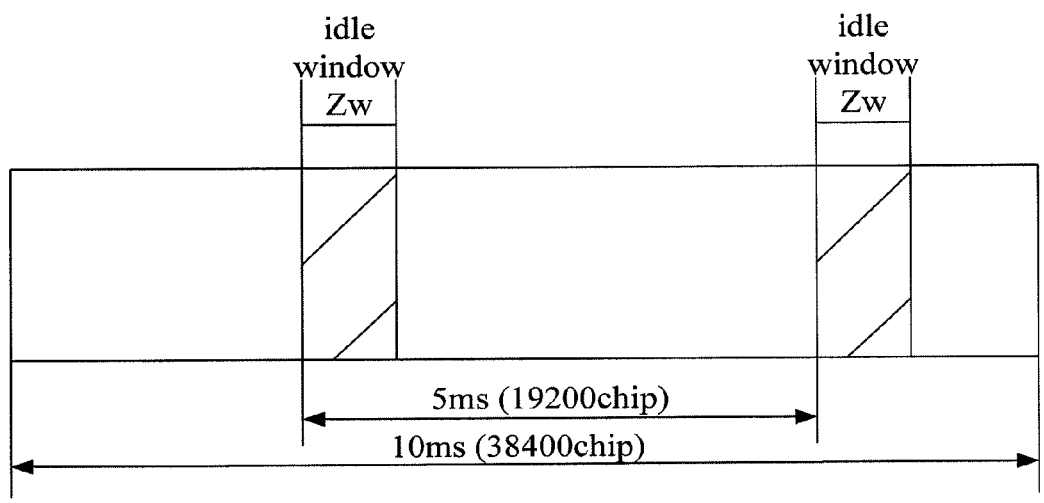
FIG. 7 is a schematic view of a data length corresponding to the idle window shown in FIG. 3 in a WCDMA frame.

FIG. 6 is a schematic view of the idle window in the TD-SCDMA subframes in the connection state/HSDPA state, and FIG. 7 is a schematic view of a data length in the WCDMA frame corresponding to the idle window shown in FIG. 6, and the idle window in the TD-SCDMA subframes is analyzed as follows:

In the connection state, there exist 2 idle time slots in an idle window of the TD-SCDMA sub-frame and the size of the idle window is Zt=1728 TDchip which is about 5184 Wchip, i.e. Zw=5184 Wchip, at least comprising 2-3 WCDMA time slot heads.

In the HSDPA state, WCDMA measurement is performed using the idle TS0+Dwpts in the TD-SCDMA subframes as the idle window, and the size of the idle window is Zt=992 TDchip which is about 2976 Wchip, i.e. Zw=2976 Wchip, at least comprising 2 WCDMA time slot heads.

Hence, in the connection state/HSDPA state, 1 complete WCDMA time slot must be received at the idle window of 1 TD-SCDMA subframe. Since the WCDMA frame has a length of 10 ms while the TD-SCDMA subframes have a length of 5 ms, after the WCDMA data of the $M^{th}$ time slot has been received in one TD-SCDMA subframe, the WCDMA data of the $(M+7)^{th}$ time slot will be received in an immediately following TD-SCDMA subframe. Thus, in the connection state/HSDPA state, the following algorithms can be used to determine the start-position of the WCDMA frame:

1) the data of one time slot of the WCDMA adjacent cells measured this time is received according to the time slot synchronization point, and the data is correlated with each sequence of the secondary synchronization sequence group of the cell, and the start-position of the WCDMA frame is determined if one time slot number is determined according to the peak of the correlation results; otherwise the next step is executed; and 2) if two time slot numbers are determined, the data of one time slot of the WCDMA adjacent cells is received again according to the time slot synchronization point, and the determined two time slot numbers respectively plus the number of the time slots of the gap between the two receiving, and then two possibilities of the time slot number of the data received this time is obtained, and the data received this time is correlated with the secondary synchronization sequences corresponding to the time slot numbers of the two possibilities, and the time slot number of the data received this time is determined according to the peak of the correlation results and the start-position of WCDMA frame is then determined according to the time slot number.

If a repetition policy is considered, the following improvements can be made:

First, M TD-SCDMA subframes are used to receive the WCDMA data for M times, and M is an integer larger than 2, and step 1) is executed, and whether to execute step 2) is judged after integrating the M results;

If step 2) is to be executed, then M TD-SCDMA subframes are used to receive the WCDMA data for M times again, step 2) is executed, and the time slot number can be obtained by integrating the M results after judgment.

Obviously, one skilled in the art can make various modifications and variations to the present invention without departing from the spirit and the scope of the present invention. In this way, if the modifications and variations to the present invention fall within the scope of the claims of the present invention and the equivalent techniques thereof, the present invention also intends to contain such modifications and variations.

INDUSTRIAL APPLICABILITY

By measuring adjacent cells using the dormant idle frames to receive data specified by the network side in the idle state and by measuring adjacent cells using the idle window to receive the data specified by the network side in the connection state, the present invention realizes the TD-SCDMA adjacent cells measurement in the WCDMA mode and the WCDMA adjacent cells measurement in the TD-SCDMA mode; and also achieves reselection and switching of the WCDMA to adjacent cells of the TD-SCDMA and the TD-SCDMA to adjacent cells of the WCDMA on this basis, meets a real-time requirement effectively, and has high industrial applicability.

What is claimed is:

1. A method for measuring power of adjacent cells, comprising the step of:
   measuring Time Division-Synchronous Code Division Multiple Access (TD-SCDMA) adjacent cells in a Wideband Code Division Multiple Access (WCDMA) mode when TD-SCDMA timing has not been obtained, wherein a terminal in an idle state uses dormant idle WCDMA sub-frames to receive data of TD-SCDMA adjacent cells specified by a network side so as to measure the TD-SCDMA adjacent cells, and in a connection state uses an idle window of the WCDMA subframes to receive the data of TD-SCDMA adjacent cells specified by the network side so as to measure the TD-SCDMA adjacent cells, said method further comprising the following steps A-C;
   step A, receiving the data of the TD-SCDMA adjacent cells, performing automatic gain control adjustment and coarse synchronization adjustment of frequency points of the TD-SCDMA adjacent areas, thereby obtaining a stable automatic gain control value of one frequency point, and the success of the coarse synchronization of the frequency point;
   step B, receiving data relevant to a downlink synchronization code according to a coarse synchronization position, finding out a position where a relevant peak is the highest which is to be used as a TD-SCDMA timing, and determining an observation time difference of all the TD-SCDMA adjacent cells with respect to the TD-SCDMA timing under the frequency point; and
   step C, receiving data in the 0th time slot relevant to a training sequence code under the frequency point according to the TD-SCDMA timing, which is for determining a received signal code power of the TD-SCDMA adjacent cells whose observation time difference has been obtained, wherein the present step is performed three times and an average value of the measurements of the received signal code powers of the three times is reported to the network side.

2. The method according to claim 1, wherein the idle window is formed in a compress mode; the pattern of the compress mode is specified by the network side, particularly comprising: the number, the position and the length of the idle window, and the number of TD-SCDMA frames using the idle window.

3. The method according to claim 1, wherein, in step A, if the coarse synchronization of all the frequency points of the TD-SCDMA adjacent cells cannot succeed, the terminal reports to the network side the minimum value as the received signal code powers of all the TD-SCDMA adjacent cells.

4. The method according to claim 1, wherein, in step A, performing coarse synchronization to one frequency point of the TD-SCDMA adjacent cells requires receiving data of the TD-SCDMA adjacent cells once.

5. The method according to claim 4, wherein the amount of the data of the TD-SCDMA adjacent cells is: received with a length of 1 frame plus 128 chips at every time.

6. A method for measuring power of adjacent cells, comprising the step of:
   measuring Time Division-Synchronous Code Division Multiple Access (TD-SCDMA) adjacent cells in a Wideband Code Division Multiple Access (WCDMA) mode when TD-SCDMA timing has not been obtained, wherein a terminal in an idle state uses dormant idle WCDMA sub-frames to receive data of TD-SCDMA adjacent cells specified by a network side so as to measure the TD-SCDMA adjacent cells, and in a connection state uses an idle window of the WCDMA subframes to receive the data of TD-SCDMA adjacent cells specified by the network side so as to measure the TD-SCDMA adjacent cells, said method further comprising the following steps a-c;
   step a, receiving the data of the TD-SCDMA adjacent cells, performing automatic gain control adjustment of one frequency point of the TD-SCDMA adjacent cells, thereby obtaining a stable automatic gain control value of the frequency point;

step b, receiving data relevant to a downlink synchronization code, and determining an observation time difference of all the TD-SCDMA adjacent cells with respect to the TD-SCDMA timing under the frequency point; and step c, receiving data in the 0th time slot relevant to a training sequence code under the frequency point according to the TD-SCDMA timing, which is for determining a received signal code power of the TD-SCDMA adjacent cells whose observation time difference has been obtained, wherein steps b-c are performed three times and an average value of the measurements of received signal code powers of the three times is reported to the network side.

7. The method according to claim 6, wherein the idle window is formed in a WCDMA compress mode; the pattern of the compress mode is specified by the network side, particularly comprising: the number, the position and the length of the idle window, and the number of TD-SCDMA frames using the idle window.

\* \* \* \* \*